United States Patent [19]
Voehringer et al.

[11] Patent Number: 5,747,884
[45] Date of Patent: May 5, 1998

[54] ARRANGEMENT FOR OPERATING AN ADJUSTMENT DRIVE

[75] Inventors: Klaus Voehringer, Malsch; Klaus Spinner, Buehl, both of Germany

[73] Assignee: Robert Bosch GmbH, Stuttgart, Germany

[21] Appl. No.: 716,180

[22] PCT Filed: Feb. 29, 1996

[86] PCT No.: PCT/DE96/00334

§ 371 Date: Sep. 30, 1996

§ 102(e) Date: Sep. 30, 1996

[87] PCT Pub. No.: WO96/31812

PCT Pub. Date: Oct. 10, 1996

[30] Foreign Application Priority Data

Apr. 7, 1995 [DE] Germany ............ 195 13 157.6

[51] Int. Cl.[6] ............................................. H02P 1/00
[52] U.S. Cl. .................... 307/10.1; 318/469; 361/30
[58] Field of Search .......................... 307/9.1, 10.1, 307/132 E, 138; 361/30, 31, 33; 318/563, 383, 434, 466–470; 49/26, 28, 291–293

[56] References Cited

U.S. PATENT DOCUMENTS

| | | | |
|---|---|---|---|
| 4,146,801 | 3/1979 | Vau et al. | 318/563 |
| 4,477,753 | 10/1984 | Ratzel et al. | 361/30 |
| 5,568,025 | 10/1996 | Sumida et al. | 318/434 |
| 5,572,098 | 11/1996 | Dreon et al. | 307/10.1 |
| 5,596,253 | 1/1997 | Mizuta et al. | 318/469 |

FOREIGN PATENT DOCUMENTS 3135888  2/1989  Germany.

OTHER PUBLICATIONS

Siemens Firmenschrift; Siemens AG, Order No. A23001–G12–D006, Umpolradius (Pole–Changing Radius), TCR 1, Jul. 1994, pp. 89–94.

Primary Examiner—Richard T. Elms
Attorney, Agent, or Firm—Spencer & Frank

[57] ABSTRACT

An arrangement for operating an adjustment drive (11) comprising a relay-controlled change-over facility (12) for the right-handed rotation/left-handed rotation of the positioning motor (10). A first semiconductor switch (23) is provided to supply current to a first relay winding (15) and a second semiconductor switch (25) to supply current to a second relay winding (16). A third semiconductor switch (26) is connected in series with the first relay winding (15) and in series with the second relay winding (16). By turning the third semiconductor switch (26) on and off, it is possible to enable or block a supply of current to the relay windings (15, 16). An alloying through of one of the first two semiconductor switches (23, 25) remains without consequences for the adjustment drive (11). An inadvertent adjustment process does not occur.

17 Claims, 1 Drawing Sheet

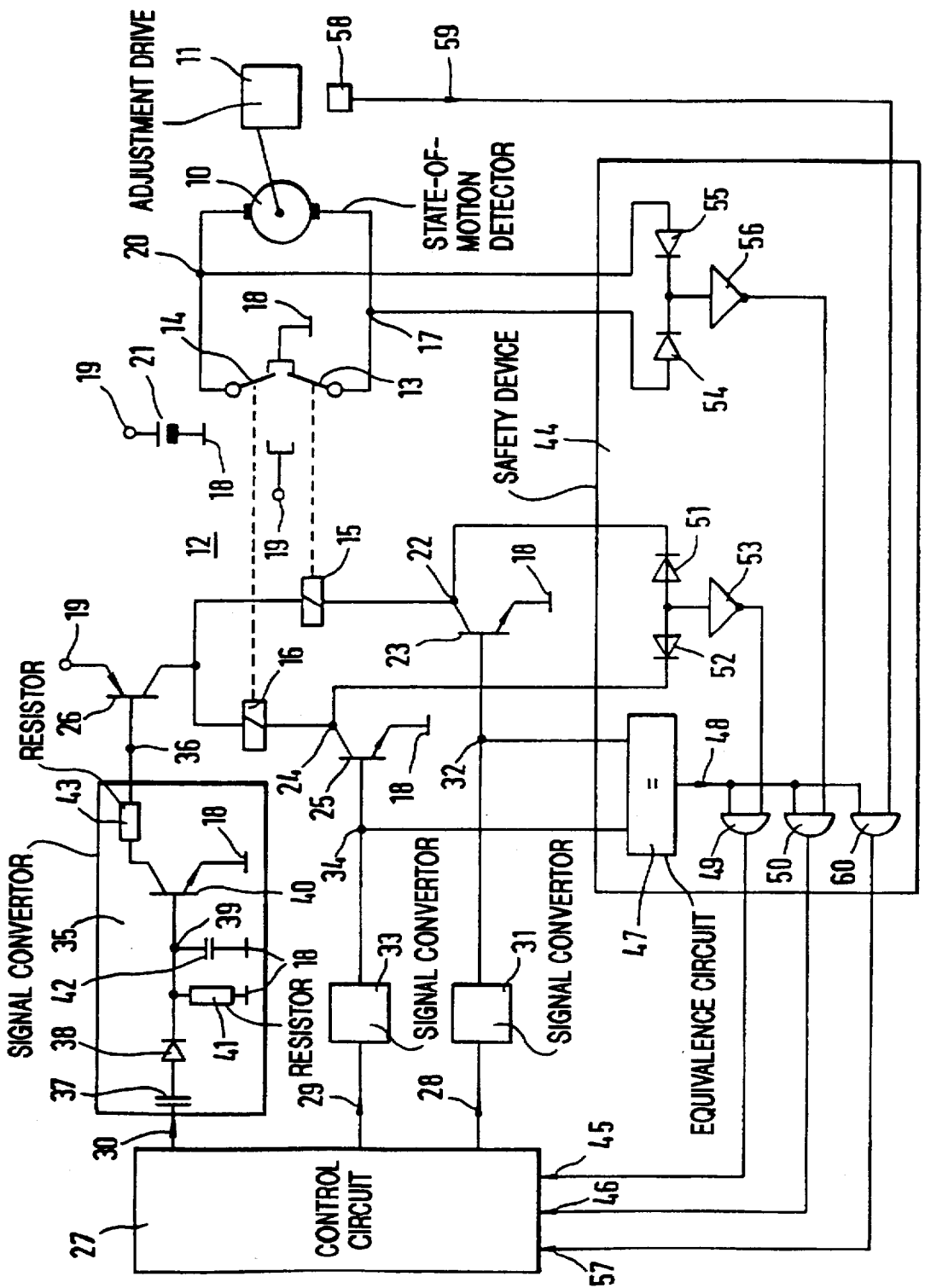

ARRANGEMENT FOR OPERATING AN ADJUSTMENT DRIVE

PRIOR ART

The invention is based on an arrangement for operating an adjustment drive of the generic type having a relay-controlled change-over facility for the right-handed rotation/left-handed rotation of a positioning motor, which comprises a first semiconductor switch to supply current to a first relay winding and a second semiconductor switch to supply current to a second relay winding. An arrangement of the generic type is known from the German Patent 31 35 888 which focuses on a safety device that links the signals appearing in a transistor-controlled change-over facility for the right-handed rotation/left-handed rotation of a positioning motor such that the positioning motor is turned off reliably in the event of a fault. The prior art arrangement comprises an error detection logic which recognizes alloyed-through transistors and blocked change-over facilities, for example, a sticking of relay contacts, as being faulty.

According to a first embodiment of the prior art arrangement, the error detection logic triggers a turn-off of the positioning motor comprised in the adjustment drive in the absence of control signals at both control inputs of the two transistors and if a signal corresponding to the switching signal appears simultaneously at the output of at least one of the two transistors.

According to another embodiment of the prior art arrangement, the error detection logic also triggers a turn-off if control signals are absent at both control inputs of the two transistors and if, simultaneously, a potential corresponding to the turn-on potential is present at at least one connection of the positioning motor.

The positioning motor comprised in the adjustment drive is turned off in the event of a fault, for example, by applying a control signal to both control inputs of the two transistors so as to simultaneously turn on the right-handed rotation and left-handed rotation of the positioning motor. The simultaneous application of the control signals has the effect that the positioning motor is kept without current.

A dual relay is known from the publication of the Siemens AG, Order No. A23001-G12-D006, Umpolradius [Pole-Changing Radius] TCR A, July 1994, which relay includes two relay windings as well as two relay contacts. The two contacts are moved with only one movable armature. If, in the event of a fault, a relay contact is stuck, it is possible to actuate the other relay contact since the armature continues to be freely movable. The supply of current to a relay winding results in the actuation of the relay contact allocated to this winding. If a fault occurs in the actuation of the prior art relay, in which one winding is continuously supplied with current, the other relay contact can no longer be closed since the armature of that winding remains in operation which was first supplied with current.

It is the object of the invention to provide an arrangement for operating an adjustment drive which arrangement offers increased safety in the event of a fault.

SUMMARY AND ADVANTAGES OF THE INVENTION

In a circuit for operating an adjustment drive, which circuit comprises a relay-controlled arrangement for the right-handed rotation/left-handed rotation of a positioning motor as well as a first semiconductor switch to supply current to a first relay winding and a second semiconductor switch to supply current to a second relay winding, at least a third semiconductor switch is present which is connected in series with the first winding and in series with the second winding. By turning the third semiconductor switch on and off, the current flow through the relay windings is blocked or enabled. By means of the measure provided by the invention it is possible, in particular, to stop the current from flowing through the relay windings independently of the state of the control signals provided for the first two semiconductor switches as well as independently of the state of the first two semiconductor switches.

Advantageous modifications and embodiments of the arrangement according to the invention ensue are disclosed and claimed.

One advantageous embodiment provides that the at least one third semiconductor switch is only turned on if either the first or the second semiconductor switch is intended to be turned on at the same time. This measures prevents the adjustment drive from being put into operation inadvertently in the event of a defect, for example, an alloying through of the first or of the second semiconductor switch.

Another advantageous measure, which increases the safety of the arrangement according to the invention, relates to the actuation of the semiconductor switches. The embodiment provides that at least the one third semiconductor switch as well as optionally the first and the second semiconductor switch are actuated dynamically. The dynamic actuation makes it possible to turn on the relevant semiconductor switch exclusively by way of an alternating voltage signal. This means that a defect in a control circuit making available the control signals, during which defect the control signals have a direct voltage level, then does not result in the adjustment drive being put into motion inadvertently.

A particularly advantageous modification provides for the use of a safety device which, by way of a plausibility check, at least examines if the first or the second semiconductor switch has alloyed through. Preferably, the safety device incorporates the relay-controlled change-over facility into the check so that a sticking of a relay contact can be detected. The safety device preferably incorporates further signals into the check.

The safety device puts out a first turn-off signal if control signals are absent at both control inputs of the first and second semiconductor switches and if a signal that corresponds to the turn-on signal appears simultaneously at the output of the first or of the second semiconductor switch.

The safety device puts out a second turn-off signal if control signals are absent at both control inputs of the first and second semiconductor switch and if a potential that corresponds to the turn-on potential appears simultaneously at at least one connection of the positioning motor.

A different measure that leads to a third turn-off signal provides for a comparison of at least the control signals of the first and second semiconductor switch with a signal that reflects the state of motion of the adjustment drive.

The first and third turn-off signal, which might occur at least in an alloyed-through first and second semiconductor switch, may be used to predetermine control signals for the first and second semiconductor switches, which control signals respectively correspond to turn-on signals. The simultaneous supply of current to both relay windings and the resulting actuation of both relay contacts shuts down the positioning motor. If the dual relay described in the prior art mentioned at the outset is used, the first and third turn-off signal cause the at least one third semiconductor switch to be turned off. With this measure, the current flow through the alloyed-through first or second semiconductor switch is blocked. Both relay windings are without current and thus turn off the adjustment drive.

The second turn-off signal, which signals a sticking of the relay contact, can likewise be used to supply current to both relay windings. In addition to the sticking contact, the contact of the other relay is turned on so that the positioning motor is shut down.

The adjustment drive is preferably used in a motor vehicle. Such adjustment drives are, for example, a window lifter drive, a sliding roof/wind-up roof drive or, for example, a seat adjustment drive. With these adjustment drives, there is the danger that objects or, in particular, body parts of persons get caught. The device according to the invention for operating the adjustment drive increases safety in these applications by way of simple means if a defect has occurred.

Further advantageous modifications and embodiments of the arrangement according to the invention for operating an adjustment drive ensue from further dependent claims and from the following description.

BRIEF DESCRIPTION OF THE DRAWING

A block diagram of an arrangement according to the invention for operating an adjustment drive is shown in the FIGURE.

DETAILED DESCRIPTION OF THE PREFERRED EMBODIMENT

The FIGURE shows a positioning motor 10 which operates an adjustment drive 11. The right-handed rotation/left-handed rotation of the positioning motor 10 is determined by a relay-controlled change-over facility 12 comprising a first and a second change-over switch 13, 14. The first change-over switch 13 is operated by means of a first relay winding 15 and the second change-over switch 14 by means of a second relay winding 16. The first change-over switch 13 connects a first connection 17 of the positioning motor 10 with either ground 18 or a power supply terminal 19. The second change-over switch 14 connects a second connection 20 of the positioning motor 10 with either ground 18 or the power supply terminal 19. An energy source 21 is connected between ground 18 and the power supply terminal 19.

The first relay winding 15 connected to an output 22 of a first semiconductor switch 23 can be connected to ground 18 via the first semiconductor switch 23. The second relay winding 16 connected to an output 24 of a second semiconductor switch 25 can also be connected to ground 18 via the second semiconductor switch 25. The two relay windings 15, 16 can be connected with the power supply terminal 19 via a third semiconductor switch 26.

A control circuit 27 makes available a first control signal 28 for the first semiconductor switch 23, a second control signal 29 for the second semiconductor switch 25 as well as a third control signal 30 for the third semiconductor switch 26. The first control signal 28 is supplied to a control input 32 of the first semiconductor switch 23 via a first signal converter 31, the second control signal 29 to a control input 34 of the second semiconductor switch 25 via a second signal converter 33, and the third control signal 30 to a control input 36 of the third semiconductor switch 26 via a third signal converter 35.

The third signal converter 35 is shown in detail. The first and second signal converter 31, 33 can be realized analogously to the third signal converter 35. The third signal converter 35 comprises a separating capacitor 37 via which the third control signal 30 is guided. A diode 38 is connected in series with the separating capacitor 37, which diode is connected to a control input 39 of a fourth semiconductor switch 40. The control input 39 is respectively connected to ground 18 via a discharge resistor 41 and via a storage capacitor 42. The fourth semiconductor switch 40, which is connected in series with a current limiting resistor 43, connects the control input 36 of the third semiconductor switch 26 to ground 18.

A safety device 44 applies respective first, second and third turn-off signal 45, 46, 57 to the control circuit 27. The safety device 44 carries out a plausibility examination of the signals which appear at the control inputs 32, 34 of the first two semiconductor switches 23, 25 both with respect to the signals appearing at the outputs 22, 24 of the first two semiconductor switches 23, 25 and with respect to the potentials appearing at the two connections 17, 20 of the positioning motor 10 as well as with respect to a state-of-motion signal 59 made available by a state-of-motion detector 58.

The control inputs 32, 34 of the semiconductor switches 23, 25 are connected to an equivalence circuit 47. The equivalence circuit 47 applies an equivalence signal 48 to a first AND gate 49, a second AND gate 50 and a third AND gate 60.

The outputs 22, 24 of the semiconductor switches 23, 25 are connected via diodes 51, 52, respectively, to a first inverter 53 which applies an output signal to the first AND gate 49. The two motor connections 17, 20 are connected via diodes 54, 55, respectively, to a second inverter 56 which applies an output signal to the second AND gate 50.

The arrangement according to the invention for operating the adjustment drive 11 functions as follows:

The control circuit 27 makes available the first two control signals 28, 29 for triggering the right-handed rotation or the left-handed rotation of the positioning motor 10. The first control signal 28 triggers, for example, a right-handed rotation of the positioning motor 10. The appearance of the first control signal 28 after passage through the first signal converter 31, the converter being explained in greater detail in the context of the actuation of the third semiconductor switch 26, at the control output 32 of the first semiconductor switch 23 turns on the first semiconductor switch 23 and therewith connects the first relay winding 15 to ground 18. A current flow in the first relay winding 15 is possible only when the third semiconductor switch 26 is turned on at the same time which connects the first relay winding 15 with the power supply terminal 19. In addition to the first control signal 28 for turning on the first semiconductor switch 23, the third control signal 30 for turning on the third semiconductor switch 26 must therefore be made available by the control circuit 27.

The third control signal 30 reaches the third signal converter 35 which has the task of converting the third control signal 30 present as alternating voltage signal into a voltage that is suitable for actuating the third semiconductor switch 26.

The separating capacitor 37 optionally separates existing direct voltage portions in the third control signal 30. Then, the alternating voltage signal reaches the storage capacitor 42 via the diode 38. Together with the discharge resistor 41, the storage capacitor 42 and the diode 38 form a peak voltage detector whose time constant is a function of the capacity value of the storage capacitor 42 and of the resistance value of the discharge resistor 41. At the control input 39 of the fourth semiconductor switch 40, a voltage that is at least approximately free of alternating voltage is available for switching the fourth semiconductor switch 40 which optionally turns on the third semiconductor switch 26 via the current limiting resistor 43. A dynamic coupling of the control signals 28, 29, 30 to the control inputs 32, 34, 36 of the semiconductor switches 23, 25, 26 is accomplished with the third signal converter 35 as well as with the other two signal converters 31, 33. Thus, a defect of the control circuit 27, which results in the control signals 28, 29, 30 being available as direct voltage signals, does not have an effect on the adjustment drive 11, because the signal converters 31, 33, 35 do not forward the faulty direct voltage signals.

Instead of the single third semiconductor switch 26 shown in the FIGURE, which connects both relay windings 15, 16 with the power supply terminal 19, two third semiconductor switches 26 can equally be used which separately connect the relay windings 15, 16 with the power supply terminal 19.

Preferably, the at least one third semiconductor switch 26 is only turned on if either the first or the second control signal 28, 29 is present simultaneously to turn on the first or the second semiconductor switch 23, 25. If, for example, a defect occurs in one of the first two semiconductor switches 23, 25, for example, alloying through, the positioning motor 10 remains turned off because of the turned off state of the third semiconductor switch 26. A faulty turning on of the positioning motor does not occur in this operating condition.

A particularly advantageous modification provides the use of the safety device 44 which is described in detail in the prior art mentioned at the outset, namely the German Patent 31 35 888. In this context, reference is made expressly to this patent specification. As a matter of principle, the safety device 44 executes plausibility considerations by comparing the signals that appear at the control inputs 32, 34 of the first two semiconductor switches 23, 25 with each other as well as with respect to the signals that appear at the outputs 22, 24 of the first two semiconductor switches 23, 25 or the potentials that appear at the connections 17, 20 of the positioning motor 10 or the state-of-motion signal 59. The equivalence signal 48 determined by the equivalence circuit 47 is only present if the signals available at the control inputs 32, 34 of the first two semiconductor switches 23, 25 are identical. The first turn-off signal 45 put out by the first AND gate 49 appears if the equivalence signal 48 is present and if the first inverter 53 puts out a signal at the same time. The first inverter 53 puts out a signal if a turn-on signal is present either at the output 22 of the first semiconductor switch 23 or at the output 24 of the second semiconductor switch 25, which signal enables the current flow through at least one of the two relay windings 15, 16. The OR interconnection is realized with the diodes 51, 52. Since the signals corresponding to a turn-on state have an L-level at the outputs 22, 24 of the semiconductor switches 23, 25, the first inverter 53 is provided which makes available an H-level from the L-level for actuating the first AND gate 49. Thus, the first turn-off signal 45 appears if control signals are not present at the control inputs 32, 34 of the semiconductor switches 23, 25 and if, simultaneously, a signal corresponding to the turn-on state appears at at least one output 22, 24 of one of the two semiconductor switches 23, 25. The safety device 44 puts out the first turn-off signal 45, in particular, in the event of alloying through of at least one of the semiconductor switches 23, 25.

The second turn-off signal 46, which provides the second AND gate 50, is also derived from the equivalence signal 48 which must appear simultaneously with the signal provided by the second inverter 56. The second inverter 56 puts out an H-level if a potential appears at at least one connection 17, 20, which potential corresponds to the potential at the power supply terminal 19. The OR interconnection is realized with the diodes 54, 55. The second turn-off signal 46 thus appears in the absence of signals at the control inputs 32, 34 of the two semiconductor switches 23, 25, which signals correspond to a turn-on state, and if a potential corresponding to the turn-on potential is present at the same time at at least one connection 17, 20 of the positioning motor 10.

The third turn-off signal 57, which provides the third AND gate 60, is also derived from the equivalence signal 48 which must appear simultaneously with the motion state signal 59 provided by the motion state detector 58. This signal is present if the adjustment drive 11 is in motion. The motion state detector 58 is realized, for example, with a position detector, preferably a Hall-effect sensor. Also suitable is a detector 58 which derives a signal, preferably an alternating voltage signal, from the current flowing through the positioning motor 10. This means that the third turn-off signal 57 is present if signals corresponding to a turn-on state are not present at the control inputs 32, 34 of the two semiconductor switches 23, 25 and if a motion of the adjustment drive 11 has been detected simultaneously.

The first and third turn-off signal 45, 57 indicating, in particular, that the first or second semiconductor switch 23, 25 has alloyed through, can be used in the control circuit 27 to output the control signals 28, 29 corresponding to a turn-on state by supplying current to both relay windings 15, 16. This measure accomplishes that, in addition to the change-over switch 13, 14 which is switched by the faulty supply of current to the associated relay winding 15, 16, for example, from ground 18 to the power supply terminal 19, the other change-over switch 13, 40 is operated simultaneously such that the positioning motor 10 is switched to be without current. The simultaneous output of control signals 28, 29 corresponding to turn-on signals can be used without difficulty for change-over facilities 12 which comprise separate relays. To the extent that the dual relay is used, which was described in the prior art mentioned at the outset, it is not possible to simultaneously supply the two relay windings 15, 16 with current with the objective of switching both change-over switches 13, 14, since the armature of the dual relay remains in operation for that relay winding 15, 16 which had been supplied with current first.

The measure intended according to the invention of using the at least one third semiconductor switch 26 which connects the relay windings 15, 16 with the power supply terminal 19 makes it possible that, in the control circuit 27 as a response to the appearance of the first and third turn-off signal 45, 57, the current supply to that relay winding 15, 16 is prevented which would be present as a fault because of the alloyed-through semiconductor switch 23, 25. The appearance of the first and third turn-off signal 45, 57 initiates the output of the control signal 30 which output corresponds to a turn-off signal of the third semiconductor switch 26.

If the measure is provided that, in any case, the third control signal 31 turns on the third semiconductor switch 26 only if the first or the second control signal 28, 29 is present at the same time, the first turn-off signal 45 is not required. The first AND gate 49 present in the safety device, the diodes 51, 52 as well as the first inverter 53 can then be deleted.

A fault, however, which is caused by sticking of one of the change-over switches 13, 14, can only be mastered by way of putting out the second turn-off signal 46. If one of the change-over switches 13, 14 is stuck, it is not sufficient to block the current flow through the two relay windings 15, 16. With this fault, it is necessary in each case that the change-over switch 13, 14 that is intact be operated at the same time. Therefore, the second turn-off signal 46 sees to it in the control circuit 27 that both the first and the second control signal 28, 29 for turning on the semiconductor switches 23, 25 are put out at the same time. This measure is independent of the configuration of the change-over facility 12. Individual, separate relays as well as the dual relay described in the prior art that was cited at the outset may be used. If in a dual relay one of the two change-over switches 13, 14 is stuck in the event of a fault, it is still possible to operate the intact change-over switch 13, 14 because the armature continues to be freely movable.

We claim:

1. An arrangement for operating an adjustment drive which has a relay-controlled change-over facility for the right-handed rotation/left-handed rotation of a positioning motor, comprising a first semiconductor switch to supply current to a first relay winding and a second semiconductor switch to supply current to a second relay winding, and wherein at least one third semiconductor switch is present which is connected in series with the first relay winding and in series with the second relay winding and which blocks or enables the current flow through the relay windings by being turned on or off; and, a control circuit for turning on the at least one third semiconductor switch and enabling the current flow through the relay windings only if the first or the second semiconductor switch is turned on.

2. An arrangement according to claim 1, wherein a safety device is present which puts out a first turn-off signal for the at least one third semiconductor switch if control signals corresponding to a turn-on state are not present at the control inputs of the first or of the second semiconductor switch and if, simultaneously, a signal corresponding to the turn-on state appears at an output of at least one of the first and second semiconductor switches.

3. An arrangement according to claim 2, wherein the first turn-off signal causes control signals to be made available which correspond to a simultaneous supply of current to the first and second relay windings.

4. An arrangement according to claim 2, wherein the first turn-off signal causes a control signal to be made available which results in turn-off of at least one third semiconductor switch.

5. An arrangement according to claim 2, wherein the safety device puts out a second turn-off signal if control signals corresponding to a turn-on state are not present at the control inputs of the first or of the second semiconductor switch and if, simultaneously, a motion state signal indicating a motion of the adjustment drive or of the positioning motor appears.

6. An arrangement according to claim 5, wherein the first and second turn-off signals cause control signals to be made available which correspond to a simultaneous supply of current to the first and second relay windings.

7. An arrangement according to claim 6, wherein the first and second turn-off signals each cause a control signal to be made available which results in turn-off of at least one third semiconductor switch.

8. An arrangement according to claim 5, wherein the safety device puts out a third turn-off signal if control signals corresponding to turn-on signals are not present at the control inputs of the first or of the second semiconductor switch and if, simultaneously, a potential corresponding to the turn-on potential is present at least one connection of the positioning motor.

9. An arrangement according to claim 8, wherein the third turn-off signal causes control signals to be made available which correspond to a simultaneous supply of current to the first and second relay windings.

10. An arrangement according to claim 1, wherein a safety device (44) is present which puts out a turn-off signal for the at least one third semiconductor switch if control signals corresponding to turn-on signals are not present at the control inputs of the first or of the second semiconductor switch and if, simultaneously, a potential corresponding to the turn-on potential is present at least one connection of the positioning motor.

11. An arrangement according to claim 10, wherein the turn-off signal causes control signals to be made available which correspond to a simultaneous supply of current to the first and second relay windings.

12. An arrangement for operating an adjustment drive which has a relay-controlled change-over facility for the right-handed rotation/left-handed rotation of a positioning motor, comprising a first semiconductor switch to supply current to a first relay winding and a second semiconductor switch to supply current to a second relay winding, and wherein: at least one third semiconductor switch is present which is connected in series with the first relay winding and in series with the second relay winding and which blocks or enables the current flow through the relay windings by being turned on or off; a control circuit is provided which makes control signals available for turning the respective semiconductor switches on and off; the control circuit makes available at least one of the control signals as an alternating voltage signal; and at least one signal converter is provided which converts the at least one control signal into a signal that is supplied to the control input of at least one of the semiconductor switches.

13. An arrangement according to claim 12, wherein the relay-controlled change-over facility is realized with a dual relay comprising two relay windings, two switches and only one armature.

14. An arrangement according to claim 12, wherein the adjustment drive is disposed in a motor vehicle.

15. An arrangement for operating an adjustment drive which has a relay-controlled change-over facility for the right-handed rotation/left-handed rotation of a positioning motor, comprising a first semiconductor switch to supply current to a first relay winding and a second semiconductor switch to supply current to a second relay winding, and wherein: at least one third semiconductor switch is present which is connected in series with the first relay winding and in series with the second relay winding and which blocks or enables the current flow through the relay windings by being turned on or off; a safety device is present which puts out a turn-off signal if control signals corresponding to a turn-on state are not present at the control inputs of the first or of the second semiconductor switch and if, simultaneously, a motion state signal indicating a motion of the adjustment drive or of the positioning motor appears.

16. An arrangement according to claim 15, wherein the turn-off signal causes control signals to be made available which correspond to a simultaneous supply of current to the first and second relay windings.

17. An arrangement according to claim 15, wherein the turn-off signal causes a control signal to be made available which results in turn-off of at least one third semiconductor switch.

* * * * *